(12) United States Patent
Takeo

(10) Patent No.: US 7,155,041 B2
(45) Date of Patent: Dec. 26, 2006

(54) ANOMALOUS SHADOW DETECTION SYSTEM

(75) Inventor: Hideya Takeo, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 302 days.

(21) Appl. No.: 09/784,112

(22) Filed: Feb. 16, 2001

(65) Prior Publication Data

US 2001/0019623 A1 Sep. 6, 2001

(30) Foreign Application Priority Data

Feb. 16, 2000 (JP) ............................. 2000-038298

(51) Int. Cl.
*G06K 9/00* (2006.01)

(52) U.S. Cl. ................. 382/128; 382/129; 382/130; 382/131; 382/132

(58) Field of Classification Search ........ 382/128–134, 382/270
See application file for complete search history.

(56) References Cited

U.S. PATENT DOCUMENTS

| | | | | |
|---|---|---|---|---|
| 5,224,036 A * | 6/1993 | Ito et al. | ................. | 382/132 |
| 5,714,764 A * | 2/1998 | Takeo et al. | ................. | 250/587 |
| 5,732,121 A * | 3/1998 | Takeo et al. | ................. | 378/62 |
| 5,761,334 A | 6/1998 | Nakajima et al. | ............. | 382/132 |
| 5,815,591 A * | 9/1998 | Roehrig et al. | ............. | 382/130 |
| 5,832,103 A * | 11/1998 | Giger et al. | ................. | 382/130 |
| 6,014,474 A * | 1/2000 | Takeo et al. | ................. | 382/308 |
| 6,266,435 B1 * | 7/2001 | Wang | ......................... | 382/132 |
| 6,320,976 B1 * | 11/2001 | Murthy et al. | ............. | 382/128 |
| 6,556,699 B1 * | 4/2003 | Rogers et al. | ............. | 382/132 |
| 6,630,937 B1 * | 10/2003 | Kallergi et al. | ............. | 345/619 |

FOREIGN PATENT DOCUMENTS

| | | |
|---|---|---|
| JP | 8-287230 | 11/1996 |
| JP | 8-294479 | 11/1996 |

OTHER PUBLICATIONS

Brzakovic et al., "An Approach to Automated Detection of Tumors in Mammograms," IEEE, 1990, pp. 233-241.*

Electronic Information Communication Society Article Magazine; Hua-Rong Jin, et al.; "Extraction of Microcalcifications on Mammogram Using Morphological Filter with Multiple Structuring Elements"; 1992; vol. J75-D-II No. 7; pp. 1170-1176.

Medical Imaging Technology; Hidefumi Kobatake; "Basic Theory of Mathematical Morphology and its Application to Mammogram Processing"; Jan. 1994; vol. 12 No. 1; pp. 59-66.

* cited by examiner

*Primary Examiner*—Jingge Wu
*Assistant Examiner*—Shefali Patel
(74) *Attorney, Agent, or Firm*—Sughrue Mion, PLLC

(57) ABSTRACT

An improved anomalous shadow detection system enables more reliable and efficient image diagnosis of an image of a suspected anomalous shadow etc. outputted by image output means. The image output means displays values of standard parameters concerning the suspected anomalous shadow and/or certainty of detection of the suspected anomalous shadow together with the image of the detected suspected anomalous shadow.

18 Claims, 8 Drawing Sheets

ENLARGED VIEW OF UPPER-RIGHT PORTION

ENLARGED VIEW OF UPPER-RIGHT PORTION

| $f_7$ | $f_6$ | $f_5$ | $f_4$ | $f_3$ |
|---|---|---|---|---|
| $f_8$ | | | | $f_2$ |
| $f_9$ | | PIXEL j | | $f_1$ |
| $f_{10}$ | | | | $f_{16}$ |
| $f_{11}$ | $f_{12}$ | $f_{13}$ | $f_{14}$ | $f_{15}$ |

ANOMALOUS SHADOW DETECTION SYSTEM

BACKGROUND OF THE INVENTION

1. Field of the Invention

The present invention relates to an anomalous shadow detection system, and more specifically, to an anomalous shadow detection system which has image output means capable of outputting an improved set of information.

2. Description of the Related Art

Several anomalous shadow detection systems have heretofore been suggested (see, e.g., Japanese Unexamined Patent Publications Nos. 8(1996)-294479 and 8(1996)-287230) to automatically detect those shadows in an image which appear to be anomalous shadows using a computer. The detection is carried out over image data (e.g., medical image data) on an object obtained by an image forming modality such as a CT (computed tomography) apparatus, an MRI (magnetic resonance imaging) apparatus, a CR (computed radiography) apparatus, etc.

Such anomalous shadow detection systems are mainly directed to detection of the anomalous shadow (e.g., a shadow of a tumor or a microcalcification) in a mammography, i.e., the anomalous shadow indicative of breast cancer etc. Each of the anomalous shadow detection systems has anomalous shadow detecting means for automatically detecting those shadows which appear to be anomalous shadows (hereinafter, referred to as "the suspected anomalous shadows"). The anomalous shadow detecting means may utilize an iris filter which extracts as the suspected anomalous shadow a spot in the image where concentration of image density slope vectors (or intensity slope vectors) is high, or a morphology filter which extracts as the suspected anomalous shadow a spot in the image where image density varies within an area smaller than a predetermined structuring element defined in accordance with an estimated size of the anomalous shadow to be detected.

The anomalous shadow detecting means using the iris filter enables automatic detection of a shadow which appears to be the shadow of the tumor (one type of the anomalous shadow hereinafter referred to as "the suspected shadow of the tumor") indicative of breast cancer etc. On the other hand, the anomalous shadow detecting means using the morphology filter enables automatic detection of a shadow which appears to be the shadow of the microcalcification (another type of the anomalous shadow hereinafter referred to as "the suspected microcalcification shadow") also indicative of breast cancer etc.

The anomalous shadow detecting means in the anomalous shadow detection system detects the suspected anomalous shadow within the image to be analyzed (i.e., the original image such as a mammograph) inputted to the system. After the detection, ROI defining means defines a local area including the detected suspected anomalous shadow and an adjacent area thereof as a region of interest (hereinafter, referred to as "ROI"). ROI image processing means then processes an image of the ROI in a specialized manner. For example, the ROI image processing means may enhance the ROI image in a predetermined manner defined corresponding to the type of the anomalous shadow to be detected (e.g., the shadow of the tumor or the microcalcification shadow). Concurrently, entire image processing means processes the entire original image in a predetermined manner to improve the readability thereof. Finally, layout image processing means merges the processed ROI image and the processed entire image into a single layout image according to a predetermined layout, and sends information descriptive of the layout image to image display means such as a CRT or printing means such as a laser printer for output.

Figure 3:
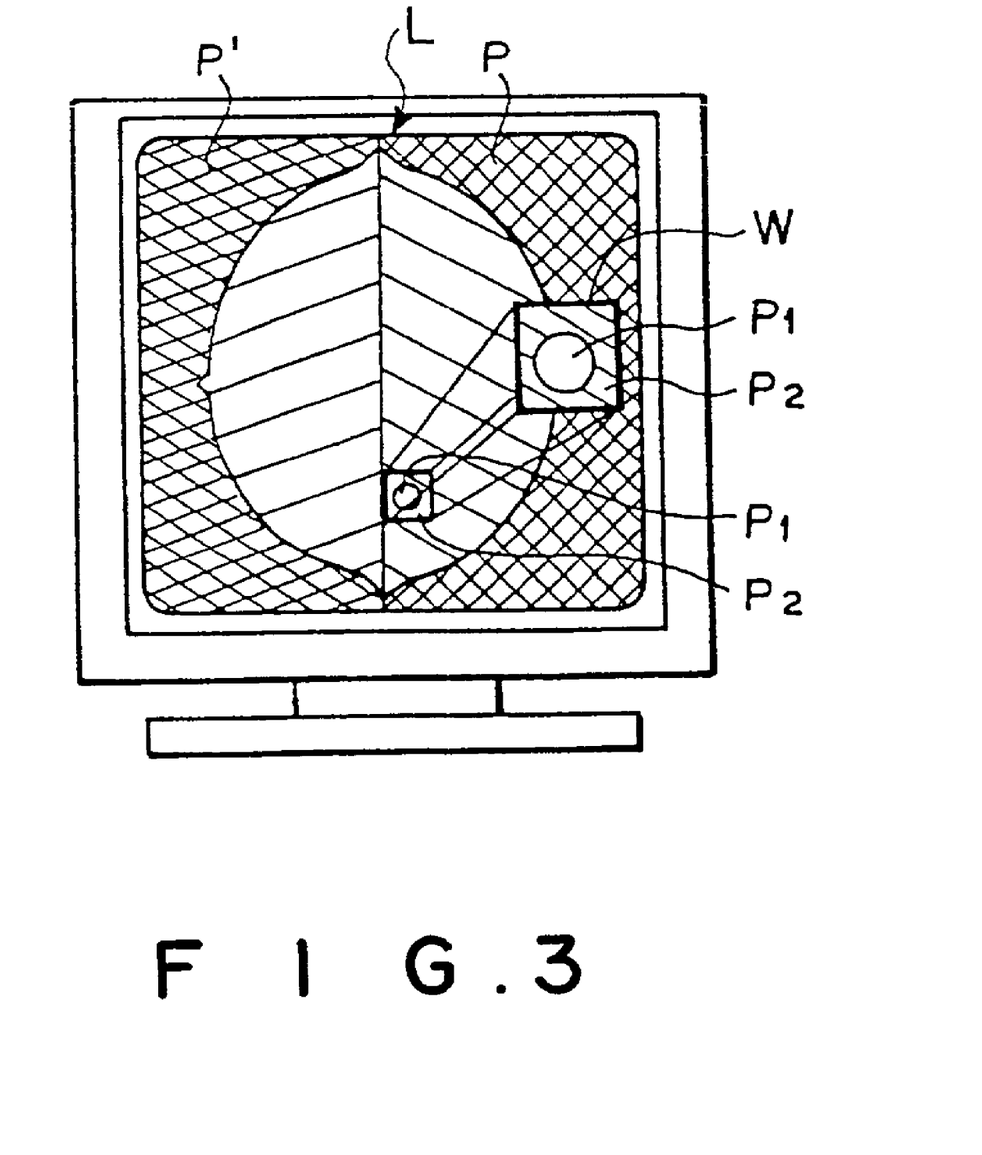
FIG. 3 illustrates the type of information outputted for display by a conventional anomalous shadow detection system, FIG. 4A to FIG. 4D schematically illustrate the concept of concentration of image density slope vectors which may occur in the mammogram.

FIG. 3 shows an example of the layout image L outputted on CRT for the case where a pair of mammographs are used as the original image. In FIG. 3, an entire image P of the right breast and an ROI image W, including a suspected anomalous shadow P1 and an adjacent area P2 thereof, are arranged on the right half of the CRT, and an entire image P' of the left breast in which no anomalous shadow was detected is shown on the left half of the CRT.

The anomalous shadow detection system detects the suspected anomalous shadow based on a predetermined threshold value for a certain standard parameter. The standard parameter is such a parameter descriptive mainly of a morphological feature etc. of a shadow and may be used to distinguish suspected anomalous shadows from normal shadows. Accordingly, any examiner may pick up the same suspected anomalous shadow regardless of his/her experience in the medical field and level of diagnostic skills.

However, what is detected by the anomalous shadow detection system is nothing more than the suspected anomalous shadow, and whether or not the shadow is a real anomalous shadow must be judged by the examiner (e.g., a doctor) who observes and examines the image outputted on the image display means such as the CRT or the printing means such as the laser printer. Therefore, it is preferable to provide the examiner with some information which supports the judgment in addition to the image itself.

SUMMARY OF THE INVENTION

The object of the present invention is to provide an anomalous shadow detection system enabling more reliable and efficient image diagnosis of an output image of a suspected anomalous shadow.

The anomalous shadow detection system of the present invention has image output means (e.g., image display) which outputs value(s) of one or more standard parameters concerning the suspected anomalous shadow, certainty (or a margin) of the detection result, etc., together with information identifying the detected suspected anomalous shadow (e.g., the image of the suspected anomalous shadow). That is to say, the anomalous shadow detection system of the present invention provides the examiner with some information which supports the diagnosis and thus more reliable and efficient diagnosis is carried out.

A first anomalous shadow detection system according to the present invention is constituted of anomalous shadow detecting means for detecting a suspected anomalous shadow from image data descriptive of an inputted image according to a prescribed detection process, and image output means for outputting information including at least information identifying the detected suspected anomalous shadow, wherein the image output means further outputs value(s) of one or more standard parameters concerning the suspected anomalous shadow together with the information including at least the information identifying the suspected anomalous shadow.

The image output means in the first anomalous shadow detection system, as well as in other anomalous shadow detection system according to the present invention, may be either of image display means such as a CRT or a liquid crystal display or printing means such as a laser printer.

The standard parameter may be any parameter representing a characteristic of the suspected anomalous shadow. For example, in the case where an iris filter is used to detect a suspected shadow of a tumor, the standard parameters may include a value indicating image density concentration of the shadow of the tumor, an output value of the iris filter, and malignancy/benignancy of the suspected shadow of the tumor. In the case where a morphology filter is used to detect a suspected microcalcification shadow, the standard parameters may include a calcification density, or malignancy/benignancy of the suspected microcalcification shadow. In addition, the values of the standard parameters may be outputted together with certainty (or a margin) of the detection result, i.e., likelihood of the suspected anomalous shadow being a real anomalous shadow. The standard parameter may be used to distinguish the suspected anomalous shadow from a normal shadow, or to provide the examiner with helpful information for conducting reliable and efficient image diagnosis.

The certainty (or margin) herein is derived based on the difference between the value of the standard parameter obtained by processing the image of a shadow in a certain manner and the threshold value for the standard parameter, wherein the shadow is regarded as the suspected anomalous shadow if the value obtained by processing the image of the shadow were greater than the threshold value.

The information identifying the detected suspected anomalous shadow may be an image of the suspected anomalous shadow or numerical data descriptive of the position, morphology or size of the suspected anomalous shadow. The image of the suspected anomalous shadow may be either of a separated image of the suspected anomalous shadow itself (which may have gone through image processing such as scaling, frequency processing or contrast enhancement), a portion of an entire image indicated by a marker such as an arrow-like pointer, a portion of an entire image surrounded by a rectangular or circular frame for indicating the position of the ROI, or a portion of an entire image outlined according to the shape of the suspected anomalous shadow.

Described in the following is a general detection procedure in the case where the iris filter is used for detecting the suspected shadow of the tumor.

In a radiation image on an X-ray film, for example, the shadow of the tumor is known to have image density slightly lower than the peripheral region thereof. Herein, a point closer to the center of the shadow has an image density value smaller than that at a point closer to the substantially circular outline of the shadow. Therefore, each point within the shadow of the tumor has a local image density slope pointing to the center of the shadow.

The iris filter recognizes the local image density slope at each point as a slope vector and outputs the concentration of the slope vectors. That is to say, using the iris filter, it is possible to determine a spot pointed to by surrounding slope vectors as the suspected shadow of the tumor.

Figure 4A:
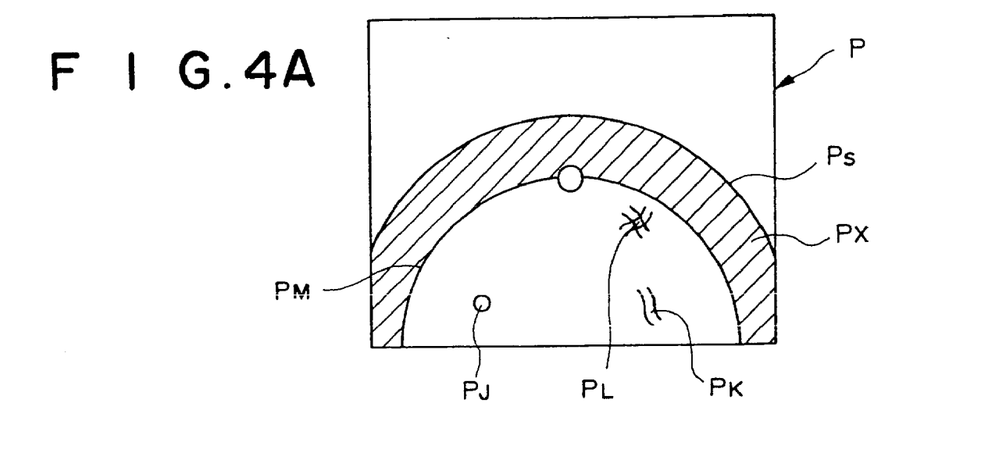
Figure 4B:
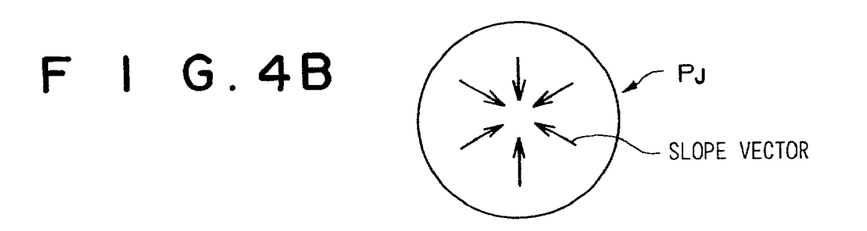
Figure 4C:
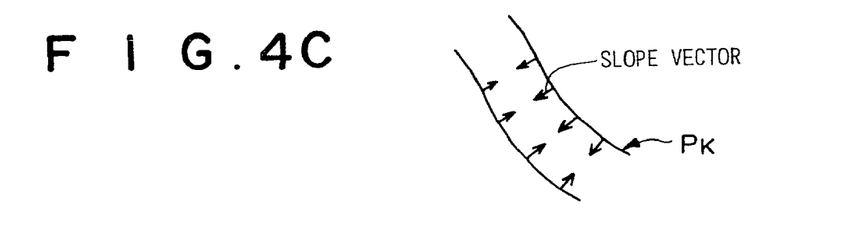
Figure 4D:
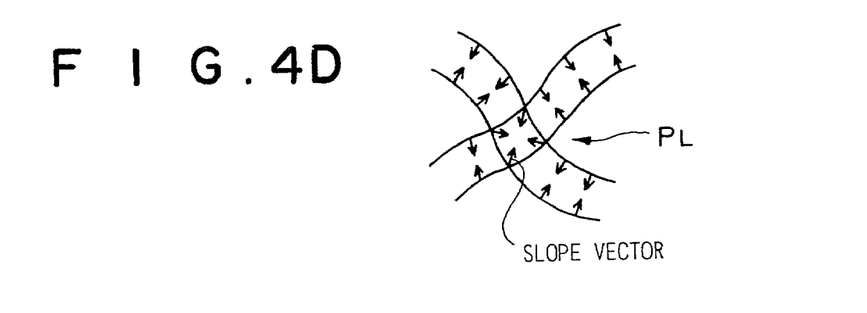

For example, in a mammograph P shown in FIG. 4A, the slope vector in each pixel within the shadow of the tumor PJ points substantially to the center of the shadow as shown in FIG. 4B. On the other hand, as shown in FIG. 4C, the slope vectors within an elongated shadow PK (e.g., a shadow of a blood vessel or a mammary gland) do not point to a single point. Therefore, the spot where the slope vectors therein point to (or concentrated at) a single point may be chosen as the suspected shadow of the tumor by evaluating local distribution of the directions of the slope vectors. In this respect, however, the examiner should be aware that a spot where two elongated shadows cross, such as the spot PL in FIG. 4D, may be detected erroneously as the suspected shadow of the tumor because the slope vectors in such a spot tend to point to a single point.

Now, each step in detection algorithm using the iris filter will be described in detail in the following.

Step 1: Step of Calculating Slope Vectors

The direction θ of the slope vector is calculated for each pixel j constituting the image to be analyzed using the following equation (1).

$$\theta = \tan^{-1} \frac{(f_3 + f_4 + f_5 + f_6 + f_7) - (f_{11} + f_{12} + f_{13} + f_{14} + f_{15})}{(f_1 + f_2 + f_3 + f_{15} + f_{16}) - (f_7 + f_8 + f_9 + f_{10} + f_{11})} \quad (1)$$

Figure 5:
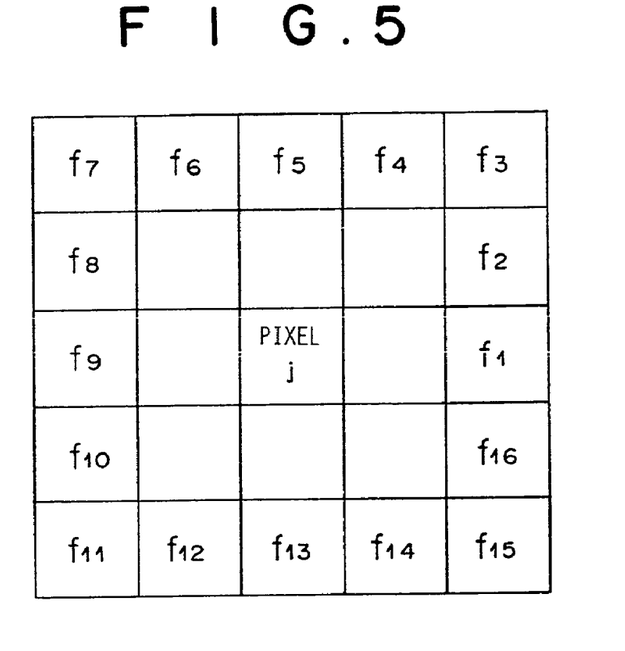
FIG. 5 shows a mask used in the iris filtering processing for calculating the image density slope vectors, FIG. 6 schematically illustrates the concepts of a pixel of interest and concentration of image density slope vectors toward the pixel of interest.

In the equation (1), each of f1–f16 represents a pixel value (i.e., image data) for one of the outermost pixels of a mask of 5×5 pixels centered on the pixel j as shown in FIG. 5.

Step 2: Step of Calculating Concentration of Slope Vectors

In the next step, the concentration C of the slope vectors toward a pixel of interest is calculated for each pixel taking that pixel as the pixel of interest by using the following equation (2).

$$C = (1/N) \sum_{j=1}^{N} \cos\theta_j \quad (2)$$

Figure 6:
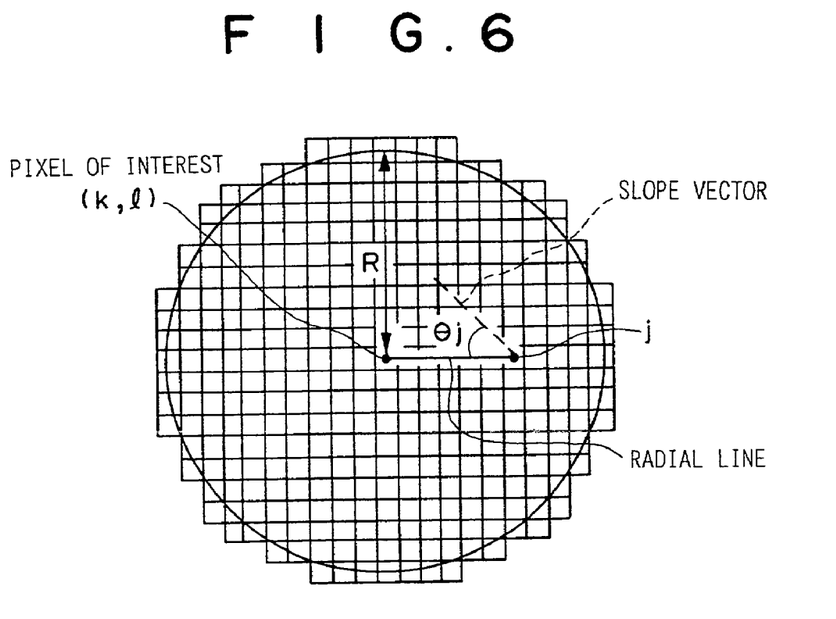

In the equation (2), N represents the number of the pixels within a circle having a radius R centered on the pixel of interest. As illustrated in FIG. 6, θ j represents an angle between a line connecting a pixel j and the pixel of interest and the slope vector at the pixel j, the direction of which has already been calculated using the equation (1). Accordingly, the value of the concentration C becomes larger when the slope vector at each pixel j has more marked tendency to point to the pixel of interest.

The slope vector of a pixel j would point substantially to the center of the shadow of the tumor regardless of a degree of contrast of the shadow, if the pixel j resided near the shadow of the tumor. Thus, it can be assumed that the pixel of interest having the concentration C of a large value would be a pixel near the center of the shadow of the tumor. On the other hand, the pixel of interest within the elongated shadow such as the shadow of the blood vessel has the concentration C of a smaller value, because the slope vectors within the elongated shadow tend to have substantially parallel directions. Accordingly, the shadow of the tumor can be appropriately detected by calculating the value of the concentration C for each pixel constituting the image to be analyzed taking that pixel as the pixel of interest and thereafter checking whether or not the calculated value of the concentration C is larger than the predetermined threshold value. As described above, the iris filter is less likely to erroneously detect the shadow of the blood vessel, the mammary gland, etc. than a regular differential filter and thus has the advantage of detecting the shadow of the tumor more effectively.

Figure 7:
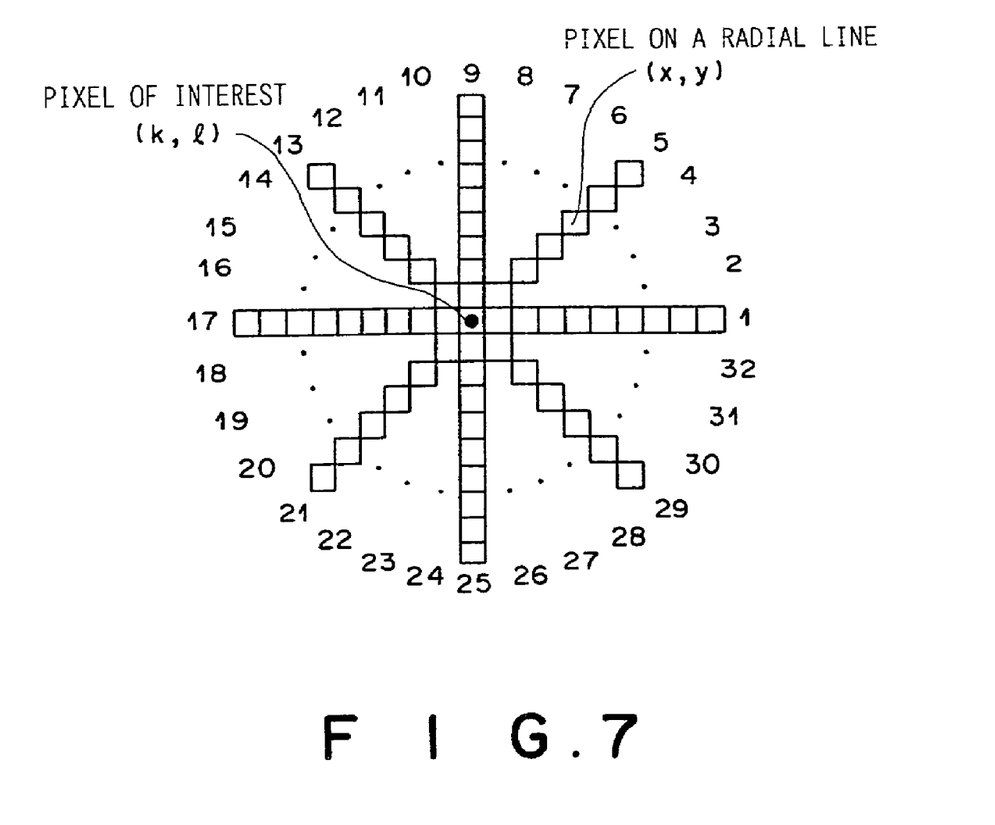
FIG. 7 shows an iris filter capable of changing the size and shape of the active portion thereof flexibly.

The iris filter used in the actual detection process is preferably configured so that the size and shape of an actually used portion thereof may be arbitrarily changed to maintain stable detection capability regardless of the size and shape of the tumor. FIG. 7 shows an example of such a filter which is different from the filter shown in FIG. 6. The filter shown in FIG. 7 evaluates the values of the concentration C for those pixels on predetermined lines extending radially from the pixel of interest. An angle between any two adjacent radial lines is $2\pi/M$, wherein M represents the number of the radial lines. In FIG. 7, M=32 is assumed and thus the angle between any two adjacent radial lines is 11.25 degree.

A set of coordinates ([x], [y]) for the nth pixel on the ith radial line is given by $$x = k + n \cos\{2\pi(i-1)/M\} \quad (3)$$

$$y = l + n \sin\{2\pi(i-1)/M\} \quad (4)$$

wherein (k, l) is a set of coordinates for the pixel of interest. [x] and [y] stands for the largest integers which do not exceed the values of x and y, respectively.

The concentration of the slope vectors within the first n pixels on a radial line i toward the pixel of interest is calculated for several values of n, and the maximum value thereof, Cimax, is selected on a line-by-line basis. Then, the average value of Cimax over every radial line i is taken as the concentration C of the slope vectors toward the pixel of interest.

More specifically, the concentration Ci(n) is first calculated for several values of n using the following equation.

$$Ci(n) = \sum_{i=1}^{n} \{(\cos\theta_{ii})/n\}, R\min \leq n \leq R\max \quad (5)$$

Derived by the above equation (5) is the concentration of the slope vectors within the first n pixels on a radial line i toward the pixel of interest, taking one integer within the range of $R\min \leq n \leq R\max$ as the value of n. Herein, Rmin and Rmax stand for the minimum radius and the maximum radius for the expected shadow of the tumor.

Based on each value of Ci(n) calculated using the equation (5), the concentration C of the slope vectors toward the pixel of interest is derived using the following equations.

$$Ci_{\max} = \max_{R\min \leq n \leq R\max} Ci(n) \quad (6)$$

$$C = (1/32) \sum_{i=1}^{32} Ci_{\max} \quad (7)$$

As each Cimax derived using the equation (6) is the maximum value of Ci(n) ($R\min \leq n \leq R\max$) for the radial line i, the dimension between the pixel of interest and the pixel having Ci(n) selected as Cimax may be considered as a radius of the suspected shadow of the tumor in the direction of the radial line.

The periphery of the suspected shadow of the tumor is defined by a set of linear lines or nonlinear lines connecting each pixel having Ci(n) selected as Cimax on each radial line i (i=1, 2, . . . , 32).

In the equation (7), the concentration C of the slope vectors toward the pixel of interest is derived by taking the average value of Cimax over every radial line i (herein, the number of radial lines is assumed to be thirty-two). This concentration C would be the output value I of the iris filter. Then, the output value I is compared with the predetermined threshold value T1. If I≧T (or I>T), the area centering on that pixel of interest would remain as the suspected shadow of the tumor, and if I<T (or I≦T), the area would be regarded as the normal area.

The above process for detecting the suspected shadow of tumor based on the concentration of the slope vectors is referred to as the "iris filtering process" as it resembles the iris of the human eye, which enlarges and shrinks corresponding to ambient brightness, in that the size and shape of the area to be examined may be changed flexibly.

In the above process, the following equation for calculating each Ci(n) may substitute for the equation (5).

$$Ci(n) = \frac{1}{n - R\min + 1} \sum_{i=R\min}^{n} \cos\theta_{il}, R\min \leq n \leq R\max \quad (5')$$

Derived by the above equation (5') is the concentration of the slope vectors within Rminth to nth pixels on a radial line i toward the pixel of interest, taking one integer within the range of $R\min \leq n \leq R\max$ as the value of n.

According to the "iris filtering process" described above, the suspected shadow of the tumor of a desired size may be preferably extracted from a radiation image.

Generally speaking, a shadow of a malignant tumor is characterized in that: (1) the periphery thereof has an irregular shape; (2) the entire shape thereof is an oval-like shape; and (3) image density in the inner area thereof has uneven distribution.

Therefore, it is desirable to further examine the suspected shadow of the tumor by conducting shape analysis thereof after comparing the output value I of the iris filter with the threshold value T1. That is to say, an additional standard parameter for the image of the suspected shadow of the tumor, e.g., spreadness, elongation, roughness, circularity or entropy thereof, may be calculated and compared with a threshold value T2 to determine a strongly-suspected shadow of the tumor. Such an additional process is hereinafter referred to as the "sub-process of the iris filtering process", as it is not included in the iris filtering process itself but constitutes a part of the entire process of determining the anomalous shadow based on the iris filtering process.

As described above, the standard parameter for distinguishing the suspected shadow of the tumor from the normal shadow according to the present invention is the concentration Ci(n) of the suspected shadow of the tumor derived using either of the equation (5) or (5'). The output value of the iris filter is represented by I and is compared with the threshold value T1. In addition, the malignancy/benignancy of the suspected shadow of the tumor may be calculated from spreadness, elongation, roughness, circularity, entropy, etc. for the image of the suspected shadow of the tumor. Further, the certainty (or margin) of the detection result may be represented by, for example, the value of (I/T1) or (I−T1).

On the other hand, a morphology filtering process is a process for detecting a suspected microcalcification shadow, which is also a characteristic feature of the breast cancer like the shadow of the tumor. The morphology filtering process determines the suspected microcalcification shadow based on the use of a multiscale λ and a structural factor (or a mask) B, and is advantageous in that: (1) the process is effective in extracting the real microcalcification shadow; (2) the process is less susceptible to complex background information; and (3) the extracted image of the microcalcification shadow is free from image distortion. That is to say, the microcalcification shadow detected using the morphology filtering process reflects geometric feature (e.g., the size, shape or image density distribution) of the real microcalcification shadow more precisely than those shadows detected using general differentiation processes. The general steps of the morphology filtering process will be described in the following.

Basic Morphology Operation

A process of morphology operations generally consists of a series of set operations in the N-dimensional space. However, the process explained hereunder is directed to a two-dimensional monotone image for simplicity.

The two-dimensional monotone image is regarded as a three-dimensional space constituted of a certain number of coordinate points, (x, y), having respective heights corresponding to image density signal f(x, y) thereof. In the present description, the image density signal f(x,y) of higher level represents higher brightness, i.e., lower image density.

Now, for further simplicity, a linear function f(x) corresponding to the image density signal along a strip of the image will be considered. A structuring element g used in the morphology operations is a symmetric function with respect to the zero-point, i.e., $$g^s(x) = g(-x) \quad (8)$$

wherein g(x)=0 within a domain of definition thereof. The domain of definition of the function g(x) is $$G = \{-m, -m+1, \ldots, -1, 0, 1, \ldots, m-1, m\} \quad (9)$$

Using the above structuring element g, basic forms of morphology operations can be written in quite simple forms as shown below.

$$\text{dilation: } [f \oplus G^s](i) = \max\{f(i-m), \ldots, f(i), \ldots, f(i+m)\} \quad (10)$$

$$\text{erosion: } [f \ominus G^s](i) = \min\{f(i-m), \ldots, f(i), \ldots, f(i+m)\} \quad (11)$$

$$\text{opening: } f_g = (f \ominus g^s) \oplus g \quad (12)$$

$$\text{closing: } f^g = (f \oplus g^s) \ominus g \quad (13)$$

Figure 8A:
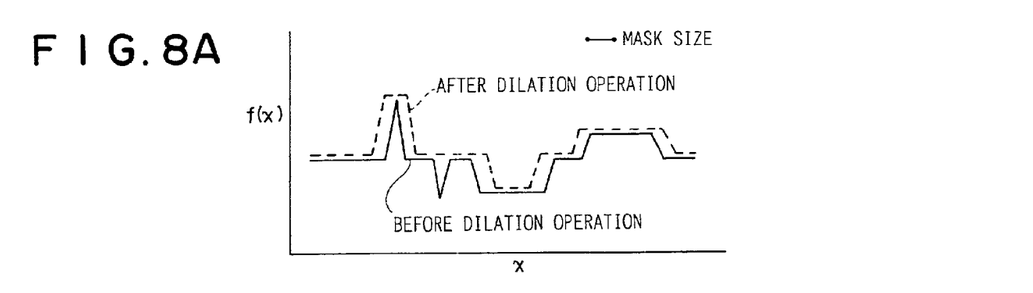
FIG. 8A to FIG. 8D are diagrams each illustrating the concept of one of the basic morphology operations.
Figure 8B:
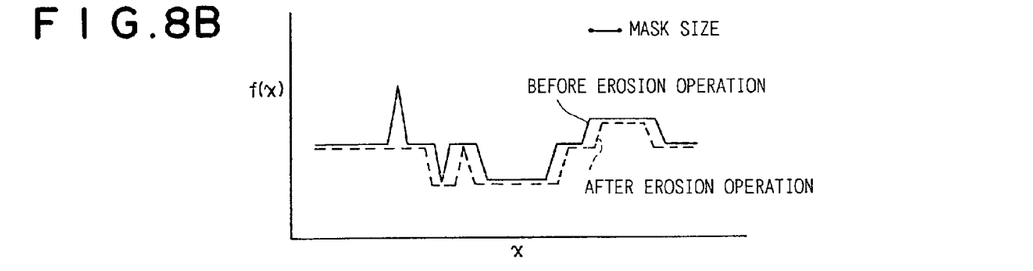
Figure 8C:
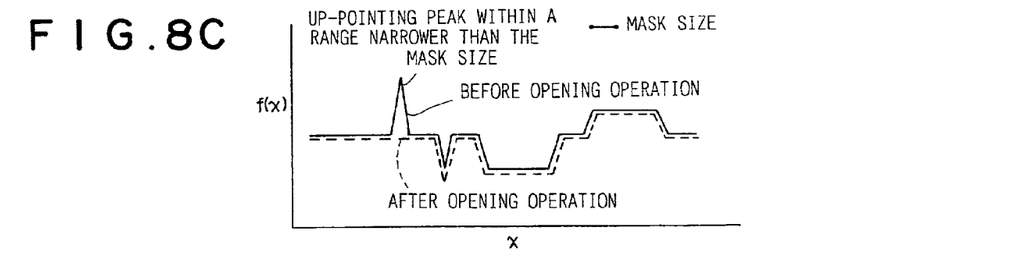
Figure 8D:
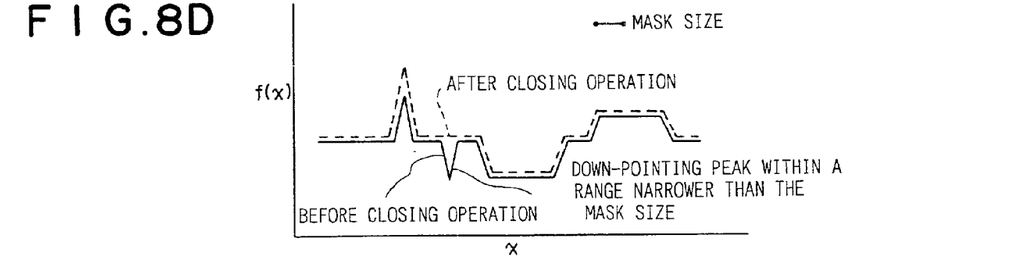

Herein, the dilation operation is an operation of searching the maximum value within a range of ±m, corresponding to the domain of definition G, centered on a pixel of interest (see FIG. 8A). The erosion operation is an operation of searching the minimum value within a range of ±m centered on a pixel of interest (see FIG. 8B). The opening operation is an operation of searching the minimum value first and then searching the maximum value. The closing operation is an operation of searching the maximum value first and then searching the minimum value. More specifically, the opening operation smoothes the image density distribution on the low-brightness side thereof to filter out up-pointing peaks (i.e., those parts with higher brightness and thus lower image density than adjacent areas thereof) which occur within a range spatially narrower than a mask size (see FIG. 8C). The mask size is 2 m in the present example. On the other hand, the closing operation smoothes the image density distribution on the high-brightness side thereof to filter out down-pointing peaks (i.e., those parts with lower brightness and thus higher image density than adjacent areas thereof) which occur within a range spatially narrower than a mask size (see FIG. 8D).

In the case where the image density signal f(x,y) of higher level represents higher image density, i.e., lower brightness, the dilation operation would be the operation identical to the above-described erosion operation (see FIG. 8B) and the erosion operation would be the operation identical to the above-described dilation operation (see FIG. 8A). Similarly, the opening operation would be the operation identical to the above-described closing operation (see FIG. 8D) and the closing operation would be the operation identical to the above-described opening operation (see FIG. 8C). In the following description, however, as well as in the above description, the image density signal f(x,y) of higher level is assumed to represent higher brightness.

Application to Calcification Shadow Detection

There has been a conventional subtraction method for detecting a calcification shadow in which a smoothed image is subtracted from an original image. However, a simple smoothing method is incapable of precisely distinguishing the calcification shadow from an elongated normal shadow (e.g., a shadow of a mammary gland, a blood vessel or tissue around the mammary gland). To overcome the problem, a morphology operation represented by the following equation (14), which is based on an opening operation using a structuring element B, was proposed in Obata's papers each titled "Extraction of Microcalcifications on Mammogram Using Morphological Filter with Multiple Structuring Elements" (Electronic Information Communication Society article magazine, D-II, Vol. J75-D-II, No. 7, p. 1170–1176, July/1992) and "Basic of Morphology Operation and its Application to Mammogram" (Medical Imaging Technology, Vol. 12, No. 1, January/1994).

$$P = f - \max_{i \in (1, \ldots, M)} \{(f \ominus B_i) \oplus B_i\} \quad (14)$$
$$= f - \max_{i \in (1, \ldots, M)} \{f_{Bi}\}$$

Figure 9:
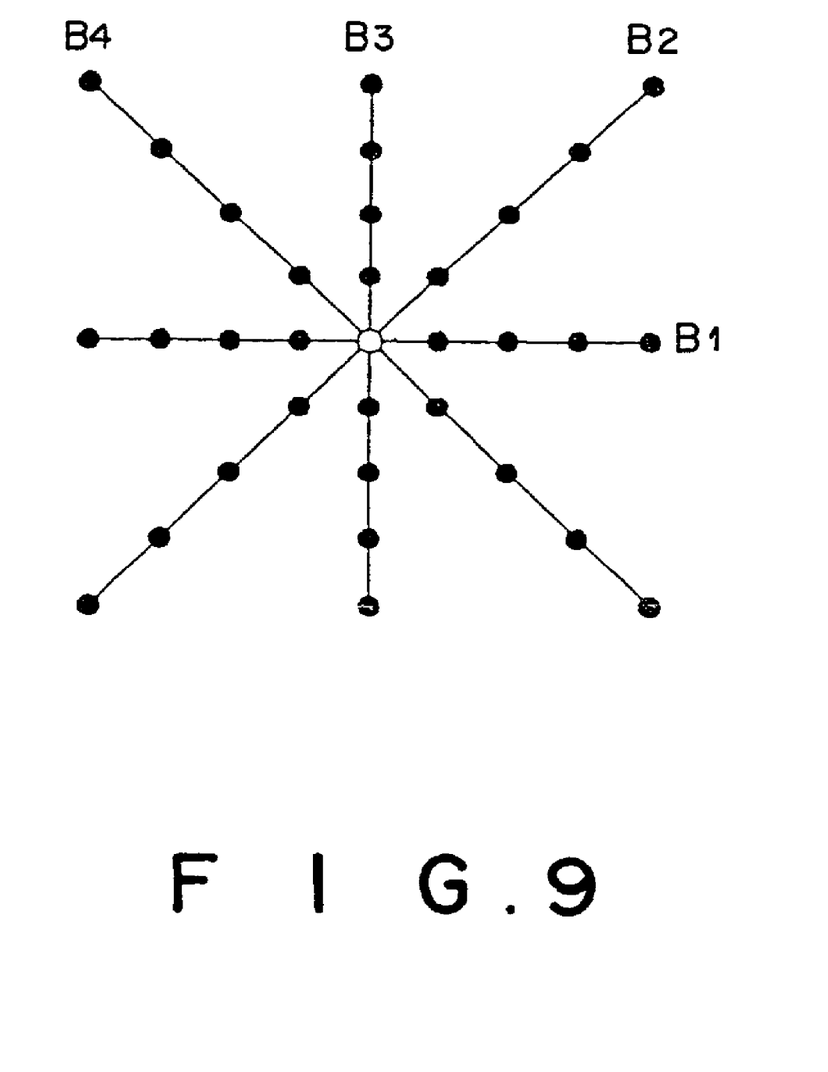
FIG. 9 illustrates the concept of the structuring element used in the morphology operation process.

In the above equation (14), Bi (i=1, 2, 3, 4) represents one of the four linear dimensions of the structuring element B as shown in FIG. 9. When selecting lines longer than respective dimensions of the target calcification shadow as the linear dimensions Bi and conducting the opening operation, the target calcification shadow will be regarded as an up-pointing peak of the image density signal which is narrower in each direction corresponding to each Bi than the structuring element B and thus will be filtered out. On the other hand, an elongated normal shadow, which usually has a dimension longer than that of structuring element B in one or more directions corresponding to directions of Bi, still remains after the opening operation (i.e., the operation represented by the second term of the equation (14)). Accordingly, an image containing only those shadows strongly suspected to be calcification shadows may be derived by subtracting the smoothed image, which is obtained through the opening operation and contains no calcification shadow, from an original image f.

In the case where the image density signal f(x,y) of higher level represents higher image density, i.e., where the closing operation is used in place of the opening operation, the following equation (15) may substitute for the equation (14).

$$P = f - \max_{i \in (1, \ldots, M)} \{(f \ominus B_1) \oplus B_i\} \quad (15)$$
$$= f - \max_{i \in (1, \ldots, M)} \{f_{bi}\}$$

However, the operation represented by equation (14) or (15) cannot eliminate a normal shadow having a size substantially the same as that of the target calcification shadow. Thus, additional morphology operation described by equation (16) is carried out to obtain differential data Mgrad used for eliminating such small normal shadows.

$$M_{grad} = (1/2) \times \{f \oplus \lambda B - f \ominus \lambda B\} \quad (16)$$

As a spot having larger value of Mgrad is more likely to be a calcification shadow, a suspected calcification shadow may be determined using the following criteria.

$$\text{IF } P(i, j) \geq T1 \text{ and } M_{grad}(i, j) \geq T2 \quad (17)$$
$$\text{Then } C_s(i, j) = P \text{ else } C_s(i, j) = 0$$

Then $C_s(i, j) = P$ else $C_s(i, j) = 0$

In the above equation (17), each of T1 and T2 represents a threshold value predetermined empirically.

In the case where the normal shadow having the size substantially the same as that of the target calcification shadow is unlikely to exist, the operation of the equation (16) may be skipped and the suspected calcification shadow may be determined based only on the first criterion (i.e., P(i,j) T1) in the equation (17) using P(i,j) obtained through the equation (14).

Again, in the case where the image density signal f(x,y) of higher level represents higher image density, the opening operation and the closing operation may substitute for each other.

The suspected calcification shadow may be examined further through an additional analysis such as the shape analysis based on the additional detection process already explained as the "sub-process of the iris filtering process". In the additional process, values of concentration, malignancy/benignancy, etc. will be calculated. Such an additional detection process is hereinafter referred to as the "sub-process of the morphology operation process."

The concentration, malignancy/benignancy, etc. calculated in the sub-process may be used as values of additional standard parameters for distinguishing the suspected calcification shadow from the normal shadow. In addition, certainty (or a margin) of the anomalous shadow detection may be represented by, for example, the value of (P(i, j)/T1) or (P(i, j)−T1) using P(i, j) in the equation (17).

A second anomalous shadow detection system according to the present invention is constituted of anomalous shadow detecting means for detecting a suspected anomalous shadow from image data descriptive of an inputted image according to a prescribed detection process, and image output means for outputting information including at least information identifying the detected suspected anomalous shadow, wherein the image output means further outputs certainty of detection of the suspected anomalous shadow together with the information including the information identifying the suspected anomalous shadow.

The terminology (e.g., meanings of the term "certainty") for the second anomalous shadow detection system is the same as that for the first anomalous shadow detection system.

According to the anomalous shadow detection system of the present invention, the examiner will be provided with helpful information for conducting reliable and efficient image diagnosis, as the image output means outputs the values of the standard parameters concerning the suspected anomalous shadow and/or the certainty (or margin) of the anomalous shadow detection together with the information identifying the detected suspected anomalous shadow.

DESCRIPTION OF THE PREFERRED EMBODIMENTS

An embodiment of the anomalous shadow detection system according to the present invention will now be described referring to attached drawings.

Figure 1:
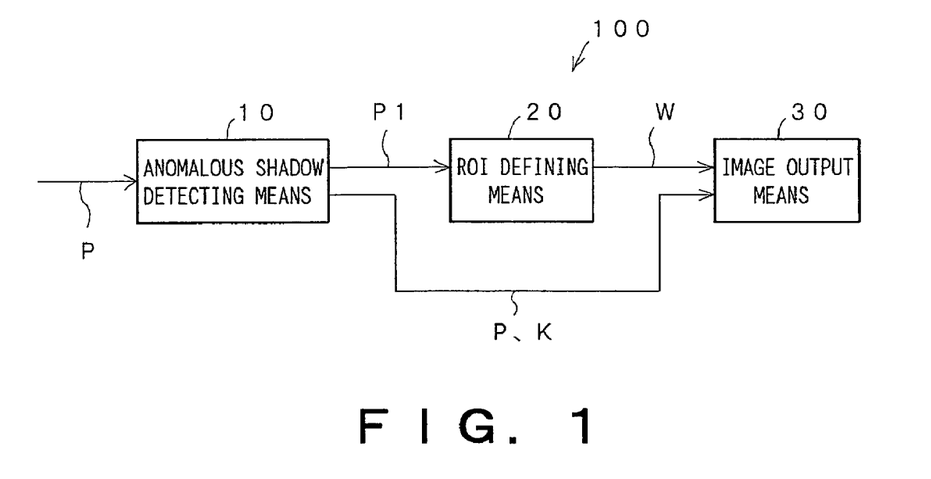
FIG. 1 is a block diagram illustrating one embodiment of the anomalous shadow detection system according to the present invention.

FIG. 1 is a block diagram illustrating one embodiment of the anomalous shadow detection system according to the present invention. An anomalous shadow detection system 100 shown in FIG. 1 takes a mammograph P of a patient as input and outputs image etc. onto image output means (e.g., CRT). Specifically, the anomalous shadow detection system 100 is constituted of: anomalous shadow detecting means 10 for detecting a suspected anomalous shadow P1 in an entire image (i.e., inputted mammograph) P; ROI defining means 20 for defining as an ROI image W a rectangular local image including the suspected anomalous shadow P1 and an adjacent area P2 thereof; and image output means 30 for outputting the ROI image W including the suspected anomalous shadow P1, the entire image P, and values of standard parameters used for distinguishing the suspected anomalous shadow from a normal shadow, altogether onto a display portion thereof.

The anomalous shadow detecting means 10 contains two programs of different kinds of algorithm. One program is a program directed to detect a spot where local image density slopes concentrate as a suspected shadow of tumor (i.e., one form of the suspected anomalous shadow P1) using an iris filter, hereinafter referred to as the iris filtering program. The other program is a program directed to detect a spot where the image density spatially varies within an area smaller than a structuring element as a suspected calcification shadow (another form of the suspected anomalous shadow P1) using a morphology filter, hereinafter referred to as the morphology filtering program. Each program is capable of detecting the number of the suspected anomalous shadows P1s and the shape, position and spreadness of each suspected anomalous shadow P1. In addition, the anomalous shadow detecting means 10 sends to the image output means 30 the values of the standard parameters for each suspected anomalous shadow and certainty (or a margin) of the detection based on threshold valus for the standard parameters. The standard parameters are parameters for distinguishing the suspected anomalous shadow from the normal shadow and may be selected from concentration of slope vectors, output value I of the iris filter, malignancy of the suspected shadow of the tumor, image density of the suspected calcification shadow, malignancy of the suspected calcification shadow, etc.

Now, the actual process carried out by the anomalous shadow detection system 100 of the present embodiment will be described in detail.

First of all, the entire image (i.e., mammograph) P is inputted to the anomalous shadow detecting means 10 in the anomalous shadow detection system 100 from a separated image forming modality (e.g., a CT apparatus or a CR apparatus). Then, either of the iris filtering program or the morphology filtering program runs in the anomalous shadow detecting means 10 to detect the suspected anomalous shadow P1 in the inputted entire image P. More specifically, a value of the standard parameter K (e.g., concentration of slope vectors, output value I of the iris filter, malignancy of the suspected shadow of the tumor, image density of the suspected calcification shadow or malignancy of the suspected calcification shadow) is calculated for each pixel in the entire image P and compared with the threshold value T thereof. If the value of the standard parameter K for a certain pixel were larger than the threshold value T, an area including the pixel would be regarded as the suspected anomalous shadow P1, and the margin between the value K and the threshold value T would be calculated. The margin between the value K and the threshold value T may be represented by, e.g., K/T, 100×(K−T)/K [%], (K−T), etc.

In the next step, the suspected anomalous shadow P1 is inputted to the ROI defining means 20. The ROI defining means 20 defines as the ROI image W an image of a local area including the suspected anomalous shadow P1 and the adjacent area P2 thereof. The above local region, i.e., ROI, may have any predetermined shape such as a rectangular shape or a circular shape. In the case where a plurality of suspected anomalous shadows are detected, the corresponding number of ROI images W will be defined. Then, the ROI defining means 20 sends data descriptive of the defined ROI image W to the image output means 30.

The image output means 30 has already been provided with the entire image P, and the value of each standard parameter K concerning the detected suspected anomalous shadow P1. Therefore, the image output means 30 can now output the ROI image W, the entire image P and the value of each standard parameter K, altogether onto display portion thereof as shown in FIG. 2.

Figure 2A:
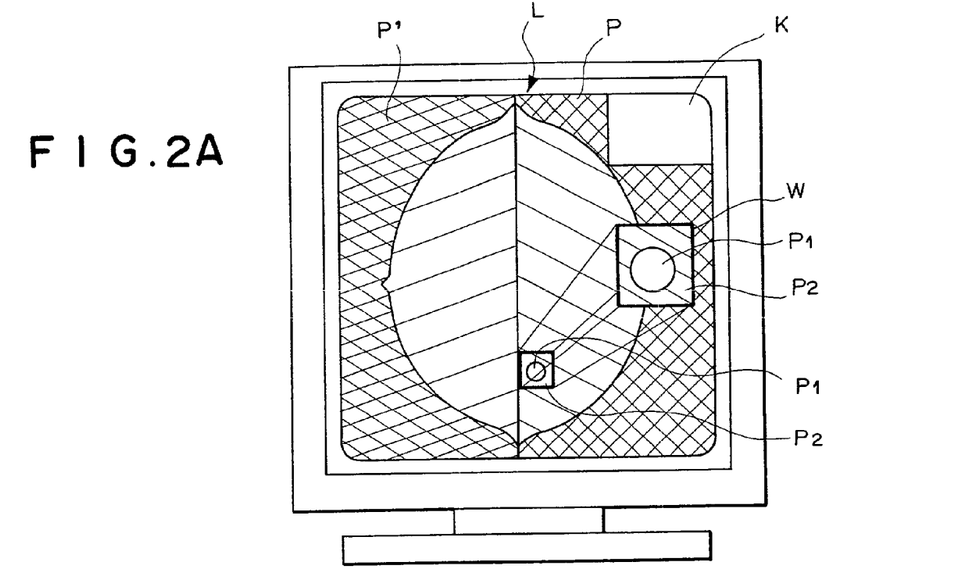
FIG. 2A and FIG. 2B illustrate the type of information outputted for display by the embodiment of the anomalous shadow detection system shown in FIG. 1.
Figure 2B:
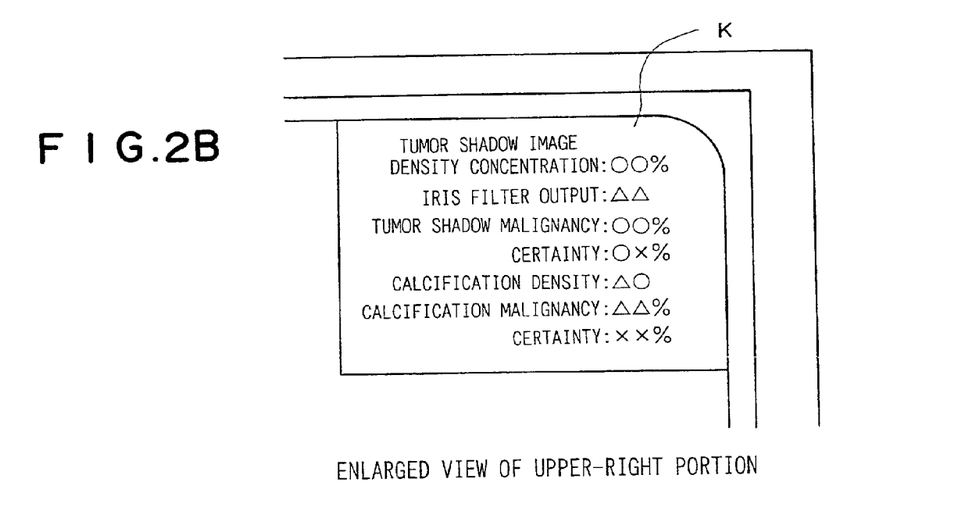

Although the display portion in FIG. 2 shows mammographs of the left breast and the right breast, P and P', displayed oppositely, it can instead show the two mammographs alternately.

According to the anomalous shadow detection system 100 of the present embodiment, the examiner will be provided with helpful information for conducting reliable and efficient image diagnosis, as the image output means 30 outputs onto display portion thereof the value of each standard parameter K used for distinguishing the suspected anomalous shadow from the normal shadow and/or the certainty (or margin) of the detection of the suspected anomalous shadow P1, together with the image of the suspected anomalous shadow P1 and the entire image P.

The embodiment described above is an embodiment common to the first and second anomalous shadow detection apparatuses according to the present invention. In the case of the first anomalous shadow detection apparatus, display of the information concerning the certainty (or margin) is not a requisite factor. On the other hand, in the case of the second anomalous shadow detection apparatus, display of the values of the standard parameters is not a requisite factor as far as the information concerning the certainty (or margin) is displayed on the image display means. Further, the entire image P is not limited to the mammograph but may be any kind of image, e.g., an X-ray image of a lung, as far as the image contains a possible target for anomalous shadow detection.

In addition, the standard parameters K outputted by the image output means 30 may also include those parameters providing the examiner with helpful information for conducting reliable and efficient image diagnosis (e.g., benignancy of the suspected anomalous shadow P1), as well as those parameters shown in FIG. 2 which are used to distinguish the suspected anomalous shadow from a normal shadow. Those standard parameters for supporting the reliable and efficient image diagnosis may be calculated by standard value calculating means (not shown), which is separated from the anomalous shadow detecting means, and sent to the image output means 30 for output. The "benignancy" parameter may be any kind of parameter as far as it reflects the benignancy of the suspected anomalous shadow in any way. For example, in the case where the morphology filter is used to detect the suspected microcalcification shadow, inverse of dispersion of the calcification density or inverse of dispersion of the sizes may be calculated as the benignancy parameter, as a benignant microcalcification shadow tends to have a substantially constant level of calcification density and size. In the above examples, a larger value of the benignancy parameter indicates higher benignancy of the microcalcification shadow.

Those standard parameters for supporting the reliable and efficient image diagnosis may be displayed together with or separated from the other standard parameters used to distinguish the suspected anomalous shadow from a normal shadow. For example, the two groups of the standard parameters may be displayed alternately at an upper-right portion of the display as shown in FIG. 2.

What is claimed is:

1. An anomalous shadow detection system comprising anomalous shadow detecting means for detecting a suspected anomalous shadow from image data descriptive of an inputted image according to a prescribed detection process, and
image output means for outputting information including at least information identifying the detected suspected anomalous shadow, wherein
the image output means further outputs type(s) and value(s) of one or more standard parameters concerning the suspected anomalous shadow in a visually recognizable manner together with the information including at least the information identifying the suspected anomalous shadow, wherein each of said one or more standard parameters is a parameter used for distinguishing the suspected anomalous shadow from a normal shadow, and the anomalous shadow detecting means detects the suspected anomalous shadow by judging whether a probability that a shadow detected according to the prescribed detection process is a malignant tumor is high.

2. An anomalous shadow detection system according to claim 1, wherein the image output means is either of image display means or printing means.

3. An anomalous shadow detection system according to claim 1, wherein the image output means further outputs certainty of detection of the suspected anomalous shadow together with the information including the information identifying the suspected anomalous shadow.

4. An anomalous shadow detection system according to claim 3, wherein the image output means is either of image display means or printing means.

5. An anomalous shadow detection system according to claim 1, wherein said one or more standard parameters include at least one of calcification density, image density concentration of the suspected anomalous shadow, an output value of an iris filter, and malignancy/benignancy of the suspected anomalous shadow.

6. An anomalous shadow detection system according to claim 5, wherein the image output means is either of image display means or printing means.

7. An anomalous shadow detection system according to claim 1, wherein
said one or more standard parameters include at least one of calcification density, image density concentration of the suspected anomalous shadow, an output value of an iris filter, and malignancy/benignancy of the suspected anomalous shadow, and wherein
the image output means further outputs certainty of detection of the suspected anomalous shadow together with the information including the information identifying the suspected anomalous shadow.

8. An anomalous shadow detection system according to claim 7, wherein the image output means is either of image display means or printing means.

9. An anomalous shadow detection system according to claim 1, wherein the anomalous shadow detecting means detects the suspected anomalous shadow by judging whether the probability that the shadow detected according to the prescribed detection process is the malignant tumor is high, prior to the image output means outputting information including the at least information identifying the detected suspected anomalous shadow.

10. An anomalous shadow detection system according to claim 1, wherein said one or more standard parameters include at least one of calcification density, image density concentration of the suspected anomalous shadow, and an output value of an iris filter.

11. An anomalous shadow detection system according to claim 1, wherein the anomalous shadow detecting means comprises one of an iris filter and a morphology filter.

12. An anomalous shadow detection system according to claim 11, wherein the anomalous shadow detecting means comprises the iris filter, and the anomalous shadow detecting means further conducts a shape analysis on geometric features of the suspected anomalous shadow.

13. An anomalous shadow detection system according to claim 11, wherein the anomalous shadow detecting means comprises the morphology filter for detecting a suspected microcalcification shadow.

14. An anomalous shadow detection system according to claim 1, wherein the one or more standard parameters are a plurality of standard parameters.

15. An anomalous shadow detection system comprising
anomalous shadow detecting means for detecting a suspected anomalous shadow from image data descriptive of an inputted image according to a prescribed detection process, and
image output means for outputting information including at least information identifying the detected suspected anomalous shadow, wherein
the image output means further outputs certainty of detection of the suspected anomalous shadow together with the information including the information identifying the suspected anomalous shadow, and the anomalous shadow detecting means detects the suspected anomalous shadow by judging whether a probability that a shadow detected according to the prescribed detection process is a malignant tumor is high.

16. An anomalous shadow detection system according to claim 15, wherein the image output means is either of image display means or printing means.

17. An anomalous shadow detection system according to any one of claims 1–8, and 15–16, wherein the information identifying the suspected anomalous shadow is either of an image of the suspected anomalous shadow or numerical data descriptive of a position, morphology or size of the suspected anomalous shadow.

18. An anomalous shadow detection system according to claim 15, wherein the anomalous shadow detecting means detects the suspected anomalous shadow by judging whether the probability that the shadow detected according to the prescribed detection process is the malignant tumor is high, prior to the image output means outputting information including the at least information identifying the detected suspected anomalous shadow.

* * * * *